United States Patent [19]

Propst

[11] 4,134,601
[45] Jan. 16, 1979

[54] STEERING APPARATUS FOR A TRAILER VEHICLE
[75] Inventor: Robert L. Propst, Ann Arbor, Mich.
[73] Assignee: Herman Miller, Inc., Zeeland, Mich.
[21] Appl. No.: 838,644
[22] Filed: Oct. 3, 1977

Related U.S. Application Data
[62] Division of Ser. No. 672,658, Apr. 1, 1976, Pat. No. 4,052,084.
[51] Int. Cl.² .............................................. B60D 1/16
[52] U.S. Cl. .................................... 280/408; 280/98; 280/444
[58] Field of Search ...................... 280/80 R, 81 A, 98, 280/411 R, 408, 410, 419, 82, 442, 443, 444

[56] References Cited
U.S. PATENT DOCUMENTS

| 1,367,166 | 2/1921 | Snyder | 280/444 |
| 1,463,699 | 7/1923 | Henry | 280/444 |

Primary Examiner—Joseph F. Peters, Jr.
Assistant Examiner—R. Schrecengost
Attorney, Agent, or Firm—Olsen and Stephenson

[57] ABSTRACT

Steering apparatus for a trailer vehicle is disclosed providing preselected turning characteristics for the vehicle. A pair of wheel assemblies are mounted at the front of the vehicle and are each pivotal about an associated vertical axis. A tie member having a plate with a longitudinal slot formed therein extends between and connects the front wheel assemblies to provide for the simultaneous pivoting of the front wheel assemblies. A tow bar is pivotally connected to the vehicle between the front wheel assemblies and is provided with a pin that extends into the slot in the plate. During pivoting, the pin is displaced both transversely and longitudinally of the vehicle, but since the pin slides in the slot only the transverse component of displacement of the tow bar is transferred to the tie member. The steering apparatus operates to pivot the front wheel assemblies from the straight forward position through an increasing angle that decreases relative to the angle through which the tow bar is pivoted as the tow bar is pivoted from the straight forward position to an angled position.

9 Claims, 9 Drawing Figures

U.S. Patent    Jan. 16, 1979    Sheet 1 of 2    4,134,601
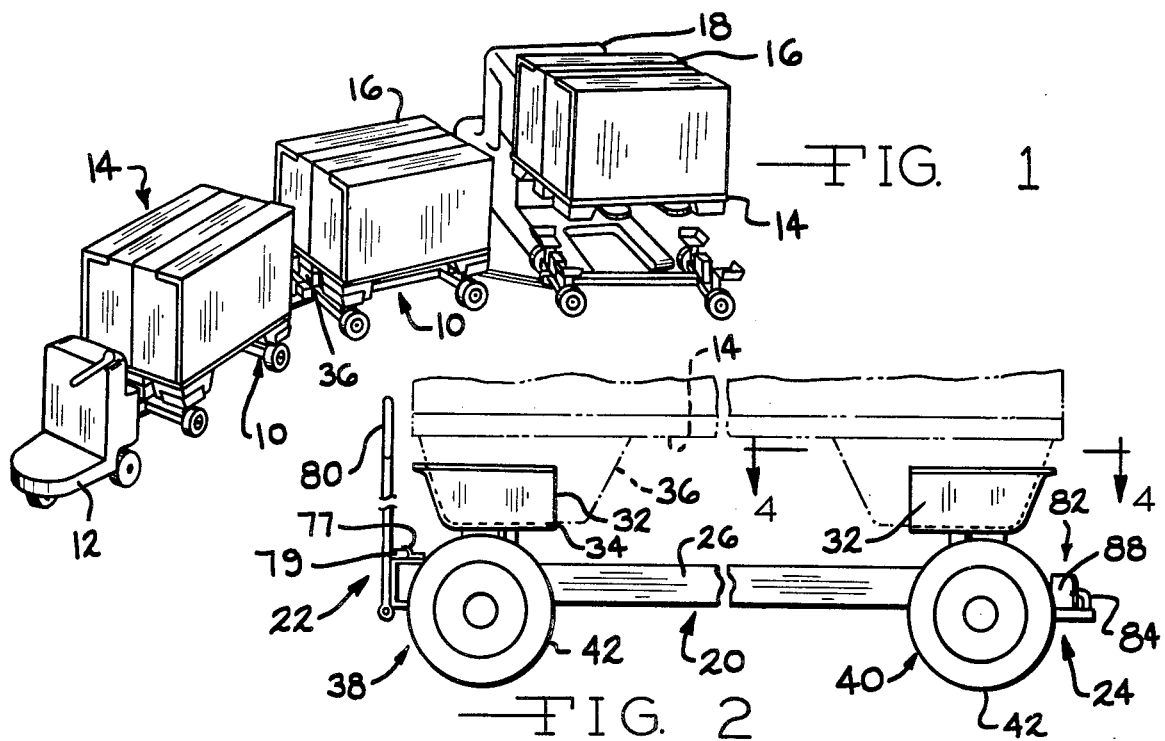
FIG. 1
FIG. 2
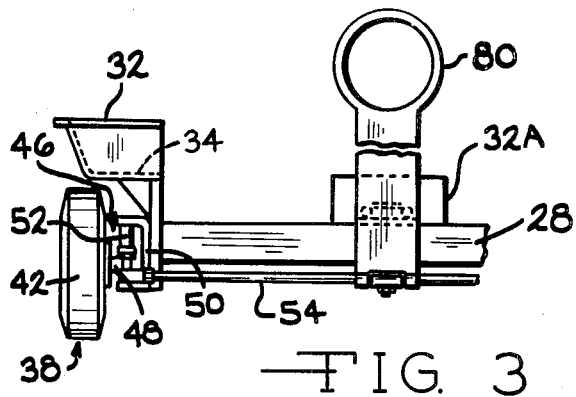
FIG. 3
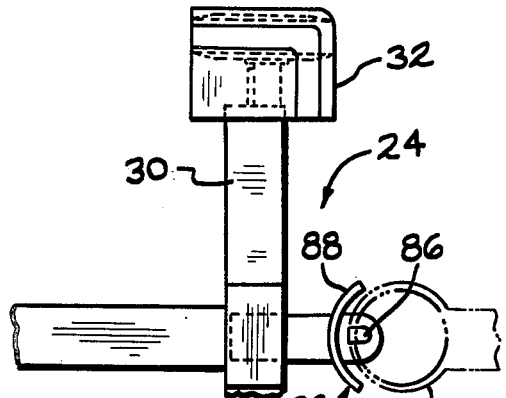
FIG. 4
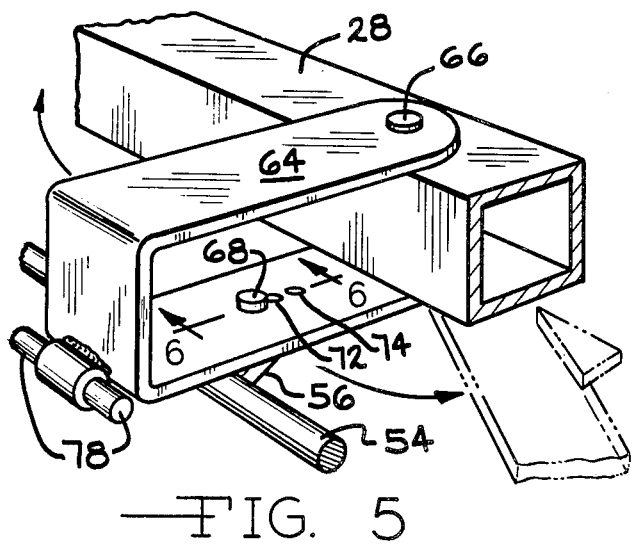
FIG. 5
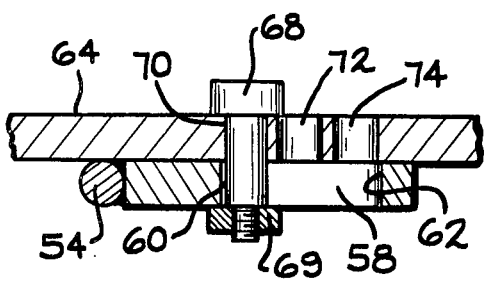
FIG. 6

STEERING APPARATUS FOR A TRAILER VEHICLE

CROSS REFERENCE TO RELATED APPLICATION

This application is a division of application Ser. No. 672,658, filed Apr. 1, 1976 and now U.S. Pat. No. 4,052,084.

BACKGROUND OF THE INVENTION

The present invention relates generally to trailer vehicles utilized in material handling applications, and more particularly, to steering apparatus for turning the vehicle. Wheeled trailer vehicles are commonly used in manufacturing, retailing, warehousing, and other activities in which materials and goods must be moved. Normally, these trailer vehicles are hitched together to form a train that is pulled by an industrial truck between locations. When a train formed of these vehicles is pulled through a corner, however, each vehicle tends to travel through a more sharply defined arc than the arc through which the preceding trailer traveled, thereby causing the train to cut the corner. This cutting of the corner problem limits the number of trailer vehicles that can be hitched together in a single train resulting in increased material handling effort and cost.

U.S. Pat. No. 2,676,029, issued to Hutchinson on Apr. 20, 1954, discloses a trailer vehicle having a steering system which enables a plurality of hitched trailer vehicles to travel through a curved path without cutting the corner. The steering system in this patent, however, consists of links for connecting the tow bar to the front wheel assemblies. These links are subjected to compressive forces as the vehicle is turned which may result in their failure due to buckling. One way to minimize buckling of the links is to use stronger but heavier links. The use of heavy links clearly increases the cost of the vehicle and their use increases the weight of the vehicle which may be undesirable.

It is the object of the present invention, therefore, to provide an improved steering system for a trailer vehicle.

SUMMARY OF THE INVENTION

In accordance with the present invention, a steering system is provided for a trailer vehicle having a frame with front and rear ends to which wheel assemblies are mounted. The front wheel assemblies are each connected to the frame for pivotal movement about an associated vertical axis and are connected together by a tie or connecting member which provides for their simultaneous pivoting. A tow bar is pivotally connected to the frame between the front wheel assemblies and is coupled to the tie member so that the pivotal displacement of the tow member is transferred to the front wheel assemblies during pivoting of the tow bar to provide for the turning of the trailer vehicle.

The steering apparatus of the present invention operates to control the turning or pivoting of the front wheel assemblies so that when the front wheel assemblies are pivoted from the straight forward position, the angle through which they are pivoted increases at a decreasing rate relative to the angle through which the tow member is pivoted as the tow member is pivoted from a straight forward position to an angled position. Thus, as the tow bar is initially pivoted from the straight forward position, the angle through which the front wheels are pivoted is generally equal to the angle through which the tow member is pivoted. Further pivoting of the tow bar, however, causes the front wheel assemblies to be pivoted through an angle that is less than the angle through which the tow member is pivoted. Consequently, during movement through corners, the trailer vehicle tracks in a circular path having a radius of curvature that is greater than the radius of curvature that is indicated by the angular position of the tow member. This arrangement enables a plurality of trailer vehicles to be hitched together and pulled in a train-like fashion around a corner without cutting the corner through which the train is pulled.

The steering system of the present invention provides a pin and slot arrangement for transferring the pivotal movement of the tow member to the front wheel assemblies. As it is pivoted, the tow bar is displaced both transversely and longitudinally of the trailer vehicle. The slot and pin arrangement transfers only the transverse component of the displacement of the tow bar to the front wheel assemblies.

A plate is mounted on the tie member between the front wheel assemblies and has a slot that extends longitudinally of the trailer vehicle. A pin is mounted on the tow member and is disposed in the slot. When the tow member is pivoted, the pin is moved in a circular path about the pivotal connection of the tow member to the frame. The pin therefore has components of displacement that extend transversely and longitudinally of the vehicle. Because the pin slides within the slot in the plate, only the transverse component of displacement of the pin is transferred to the tie member and thus to the front wheel assemblies.

Selective positioning of the pin in the slot when the tow bar and the wheel assemblies are in straight forward positions controls two movements. First, the angle of pivoting of the tow bar and therefore the angle of pivoting of the front wheel assemblies is terminated when the pin engages the end of the slot. Second, varying the distance between the pivotal connection of the tow bar to the vehicle and the pin changes the angle through which the front wheel assemblies are pivoted relative to the angle through which the tow bar is pivoted.

Further objects, features and advantages of the present invention will become apparent from a consideration of the following description when taken in connection with the appended claims and the accompanying drawing in which:

FIG. 1 is a perspective view of three material handling carts or trailer vehicles hitched together;

FIG. 2 is a side elevational view of a single trailer vehicle shown in FIG. 1;

FIG. 3 is a fragmentary front elevational view of the trailer vehicle illustrating a portion of the steering apparatus of the present invention;

FIG. 4 is a fragmentary plan view of the rear end of the trailer vehicle illustrating the hitch construction taken substantially from line 4—4 in FIG. 2.;

FIG. 5 is an enlarged fragmentary perspective view of a portion of the steering apparatus used in the trailer vehicle;

FIG. 6 is a sectional view of a portion of the steering apparatus taken substantially from liens 6—6 in FIG. 5;

Figure 7:
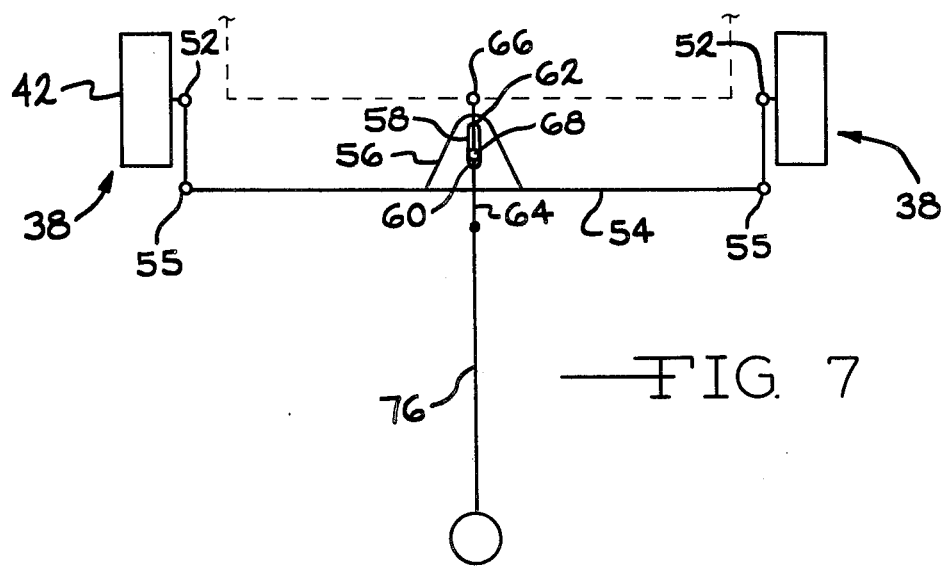
FIG. 7 is a diagrammatic plan view of the steering apparatus illustrated in FIGS. 3 and 5.

Referring to the drawing, a plurality of transport carts or trailer vehicles, indicates at 10 in FIG. 1, are hitched together in a train-like fashion and are towed between locations by an industrial truck 12. Each trailer vehicle 10 supports a pallet 14 which is provided with a security cover 16 for protecting the contents stored on the pallet 14. The pallets 14 can be easily placed on and removed from the trailer vehicles 10 by such means as the forklift truck 18.

Each trailer vehicle 10 includes a main frame 20 having front and rear ends 22 and 24, respectively, as illustrated in FIGS. 2-4. The frame 20 includes a longitudinal frame member 26 to which a front cross frame member 28 and a rear cross frame member 30 are each secured in substantially perpendicular relation with the main frame member 26. Upright leg supports 32 are mounted at opposite ends of the cross members 28 and 30 and each support 32 includes a load carrying portion 34 that is spaced above the frame 26 for supporting a leg 36 of the pallet 14 in spaced relation with the frame 26. This arrangement provides an access space between the pallet 14 and the frame 20 which enables the forks of the forklift truck 18 to engage the underside of the pallet 14 for lifting the pallet. Additional upright leg supports 32A are centrally mounted between the leg supports 32 on the cross frame members 28 and 30 and serve to engage centrally disposed legs 36 on the pallet 14.

Front wheel assemblies 38 are mounted at the front end 22 of the frame 20 and rear wheel assemblies 40 are mounted at the rear end 24 of the frame 20. Each rear wheel assembly 40 includes a wheel 42 that is rotatably mounted on an axle 44 that is secured to the rear cross member 30. Each front wheel assembly includes a wheel 42 which is rotatably mounted to an axle 48 on a steering knuckle 46 which is pivotally connected by a vertical pin 52 to a bracket 50 that is mounted to the front cross frame member 28. Each vertical pin 52 defines an associated vertical axis about which one of the front wheel assemblies 38 pivots.

The steering knuckles 46 are pivotally connected at 55 (FIG. 7) by a connecting or tie member 54 which extends between the front wheel assemblies 38. The tie member 54 is pivotally connected to each steering knuckle 46 at a selected position forwardly of the vertical axis defined by the pin 52. Accordingly, transverse movement of the tie member 54 provides for the simultaneous pivoting of the front wheel assemblies 38 about their associated vertical axes 52.

A plate 56 is secured to the tie member 54 at a central location thereof and is provided with a slot 58 that extends longitudinally with respect to the vehicle 10. The slot 56 has a front wall 60 and a rear wall 62.

A tow member in the form of a steering yoke 64 having a C-shaped configuration straddles the cross member 28 and is pivotally connected thereto at a central location between the front wheel assemblies 38 by means of a pin 66 which defines a vertical axis about which the yoke 64 is pivoted in generally horizontal directions to turn the vehicle 10 (FIG. 5). As seen in FIG. 7, the pin 66 and the pins 52 are located in a line so that the axes of rotation defined by the pins 52 and 66 are located in this common line.

The tie member 54 and the plate 56 are positioned below and adjacent the lower arm of the tow member 64 through which a series of holes 70, 72, and 74 are formed. The tow member 64 is coupled to the tie member 54 by pin means in the form of a bolt 68 that is positioned in one of the holes 70-74 to extend through the slot 58 in the plate 56. A nut 69 is threadably mounted on the bolt 68 maintaining it in place. During pivoting of the tow member 64, the bolt 68 slides in the slot 58 as the plate 56 moves relative to the tow member 64. The bolt 68 can be selectively positioned in one of the holes 70-74 to vary the distance between the pin 66 and the bolt 68 thereby varying the radius of curvature of the bolt 68 as the tow member 69 is pivoted.

As viewed in FIG. 7, the distance between the pin 66 and the bolt 68 is less than the distance between the pin 52 and the pivotal connection 55 of each wheel assembly 38. This difference in distance provides the vehicle 10 with a turning characteristic whereby the angle through which each front wheel assembly 38 is pivoted increases at a decreasing rate relative to the angle through which the tow member 64 is pivoted when both the tow member 64 and the front wheel assemblies 38 are pivoted from the straight forward positions. If the distance between the pin 52 and the pivotal connection 55 of each wheel assembly 38 remains constant and the distance between the pin 66 and the bolt 68 is increased to equal the distance between the pin 52 and the pivotal connection 55, the resulting turning characteristic is one wherein the angle through which the front wheel assemblies 38 are pivoted equals the angle through which the tow member 64 is pivoted. So, varying the distance between the pin 66 and the bolt 68 by selective positioning of the bolt 68 in one of the holes 70-74 varies the turning characteristic of the vehicle 10.

A towing tongue 76 is pivotally connected to the yoke 64 by means of laterally extending pins 78 so that the tongue 76 can be pivoted up and down. The tongue 76 can be maintained in the upright position by a clip 77 which engages an extension 79 attached to the tongue 76. The tongue 76 is provided with a ring-like construction 80 at its forward end enabling the connection of the tongue 76 to a hitch 82 that is attached at the rear end 24 of each trailer vehicle 10. The hitch 82 includes a hook member 84 having a forwardly extending section 86. The ring 80 of the trailing vehicle 10 is hitched to the hook member 84 to connect a pair of trailer vehicles 10. A curved barrier 88 is provided at a position forwardly of the hook member 84 and serves to prevent the trailing vehicle 10 from moving forwardly relative to the preceding vehicle 10 when the train vehicles 10 are brought to a stop.

Figure 8:
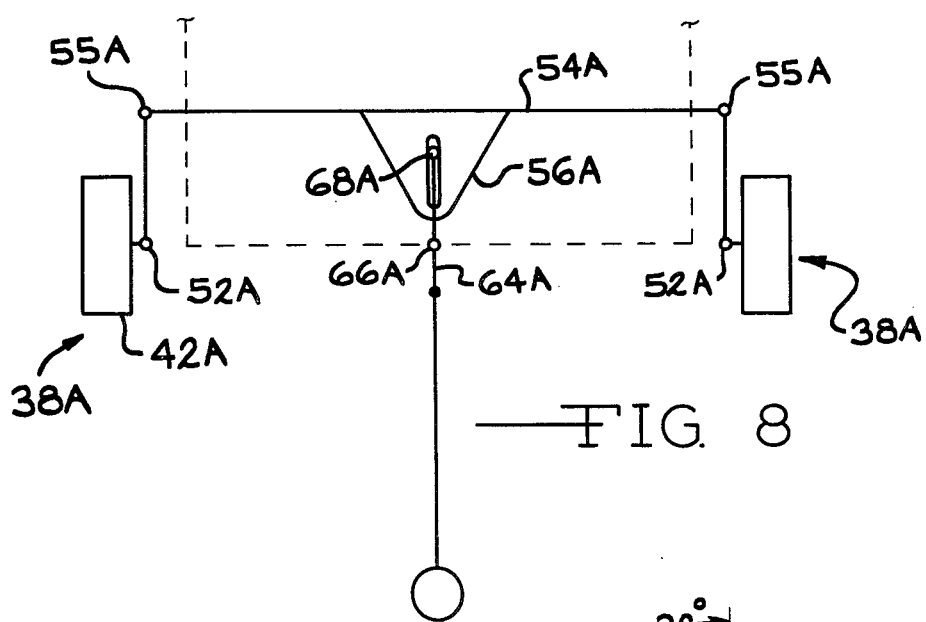
FIG. 8 is a diagrammatic plan view of a modified form of the steering mechanism shown in FIG. 7.
Figure 9:
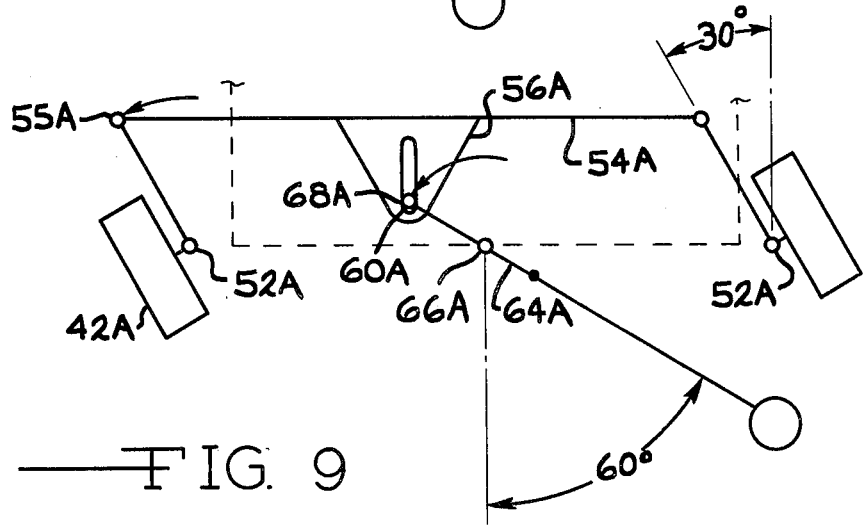
FIG. 9 is a diagrammatic plan view of the steering mechanism illustrated in FIG. 8 showing the front wheels and the steering apparatus in the turned position.

With reference to FIGS. 7-9, the steering apparatus, as previously described, serves to pivot the front wheel assemblies 38 through an angle which increases at a decreasing rate relative to the angle through which the tow member 64 is pivoted when the tow member 64 and the wheel assemblies 38 are pivoted from their straight forward positions to angled positions. To accomplish this, the pivot points 52 and 66 are located in a common line, and the distance between the axis 52 and the pivot point 55 on the steering knuckle 46 to which the tie member 54 is pivotally connected is greater than the distance between the pin 66 and the bolt 68. Thus, the radius of curvature of the bolt 68 as it is pivoted about the pin 66 is less than the radius of curvature of the pivot 55 as it is pivoted about the vertical axis 52. This arrangement provides for a decreased pivoting of the wheel assemblies 38 relative to the pivoting of the tow member 64 as the tow member 64 is pivoted from its generally straight forward position to an angled position.

When the tow member 64 is pivoted, the pin 68 is moved in a circular path. Consequently, the displacement of the pin 68 as the tow member 64 is pivoted has components which extend both transversely and longitudinally of the vehicle 10. During pivoting of the tow member 64, the pin 68 slides longitudinally within the slot 58 so that only the transverse component of the circular displacement of the bolt 68 is transferred to the tie member 54 to pivot the front wheel assemblies 38. A predetermined selection of the distances between the vertical axis 52 and the pivot 55 and the distance between the pin 66 and the bolt 68 determines the proportion in which the wheel assemblies 38 will be pivoted relative to the pivoting of the tow member 64. Thus, the tracking characteristics of the vehicle 10 can be adjusted to provide the desired results.

The slot 58 is provided with the front wall 60 and the rear wall 62. As the tow member 64 is pivoted about the pin 66, the bolt 68 moves toward the rear wall 62. When the pin 68 engages the rear wall 62, the tow member 64 can be pivoted no further. In this manner, the pivoting of the tow member 64 and the front wheel assemblies 38 is limited.

FIGS. 8 and 9 diagrammatically show a modified form of the steering apparatus wherein the tie member 54A is located at a position behind the front wheel assemblies 38A. In this modification, the pin 66A is still maintained in a common line with the pins 52A. However, the pivotal connections 55A are located at positions rearwardly of the wheel assemblies 38A. Nevertheless, the operation of the steering apparatus remains essentially the same as in the embodiment illustrated in FIG. 7. That is, the distance between the pin 66A and the bolt 68A is less than the distance between the pivot 55A and the pin 52A on each assembly 38A. When the tow member 64A is pivoted about the pin 66A, the bolt 68A moves forwardly in the slot 58A as is illustrated in FIGS. 8 and 9. As the tow member 64A is initially pivoted from its straight forward position, the angle through which the front wheel assemblies 38A are turned is approximately equal to the angle through which the tow member 64A is pivoted. Further pivoting of the tow member 64A causes the front wheel assemblies 38A to be further pivoted but through an angle that is less than the angle through which the tow member 64 has been pivoted. As shown in FIG. 9, a 60° pivoting of the tow member 64A results in the front wheel assemblies 38A being pivoted 30°. It is to be understood that these angles are only representative of numerous relationships that can exist between the pivoting of the tow bar 64A and the pivoting of the front wheel assemblies 38A.

As can be seen from the above description, an improved steering apparatus for a trailer vehicle has been disclosed which provides a preselected tracking characteristic for a trailer vehicle 10 as it is being towed. The slot and pin arrangement reduces compressive forces that are applied to the tie member 54 thereby enabling the use of lighter weight materials in constructing the steering apparatus. The steering apparatus is durable and can be installed at a relatively low cost.

What is claimed is:

1. Steering apparatus for a vehicle having a frame with front and rear ends, a plurality of wheel assemblies connected to said frame for reducing road friction, means pivotally connecting a pair of said wheel assemblies to said frame at the front end thereof, each of said front wheel assemblies being pivotal about an associated vertical axis, said steering apparatus including a connecting member extending between and being connected to said front wheel assemblies and operable to provide for simultaneous pivoting of each of said front wheel assemblies about its associated vertical axis, said connecting member being pivotally connected at one end thereof to one front wheel assembly and at the other end thereof to said other front wheel assembly, the pivotal connection of said connecting member to each of said front wheel assemblies being spaced a preselected distance from the associated vertical axis of each of said front wheel assemblies, a tow member, means pivotally connecting said tow member to said frame between said front wheel assemblies for pivotal movement in generally horizontal directions, said tow member being displaced both transversely and longitudinally of said vehicle during pivoting thereof, and means coupling said tow member to said connecting member operable to transfer only the transverse displacement of said pivoted tow member to said connecting member, said coupling means including means forming a slot on one of said members extending generally longitudinally of said vehicle, pin means on said other member and positioned to be disposed in said slot, the distance between said pin means and the pivotal connection of said tow member to said frame being less than the distance between the associated vertical axis and the pivotal connection of said connecting member to each of said front wheel assemblies.

2. The steering apparatus according to claim 1 wherein said coupling means comprises a plate having said slot formed therein, said plate being mounted on one of said members in a position in which said slot extends in a direction generally longitudinally of said vehicle, said tow member having a plurality of holes formed therethrough and spaced at selected distances from the pivotal connection of said tow member to said frame, said pin means comprising a pin member selectively positioned in one of said holes in said tow member and extending into said slot whereby the turning angle of the front wheel assemblies can be varied relative to the turning angle of said tow member by selective positioning of said pin member in one of said holes in said tow member.

3. The steering apparatus according to claim 2 wherein said plate is mounted on said connecting member and said pin member is mounted on said tow member.

4. The steering apparatus according to claim 2 wherein said slot defines spaced apart front and rear walls, and wherein said tow member is pivoted from a generally forward position in which said vehicle can be moved along a generally straight path to an angled position in which said front wheel assemblies are pivoted so that said vehicle can be moved along a curved path, said pin member being moved during pivoting of said tow member toward one of said walls, the angle of pivoting of said tow bar being terminated when said pin means engages said one wall, said pin means being positioned a predetermined distance from said one wall in said forward position of said tow member to limit the pivoting of said tow member to a predetermined angle.

5. The steering apparatus according to claim 2, wherein the associated axis of each of said front wheel assemblies and said pivotal connection of said tow member to said frame are located substantially in linear alignment.

6. The steering apparatus according to claim 5, wherein said connecting member is positioned forwardly of the pivotal connection of said tow member to said frame.

7. The steering apparatus according to claim 5 wherein said connecting member is positioned rearwardly of the pivotal connection of said tow member to said frame.

8. The steering apparatus according to claim 6 wherein said pin member is positioned forward of the pivotal connection of said tow member to said frame.

9. The steering apparatus according to claim 7 wherein said pin member is positioned rearwardly of the pivotal connection of said tow member to said frame.

* * * * *